Q. A. GILMORE.
Limestone Cutter.
No. 25,254.
Patented Aug. 30, 1859.
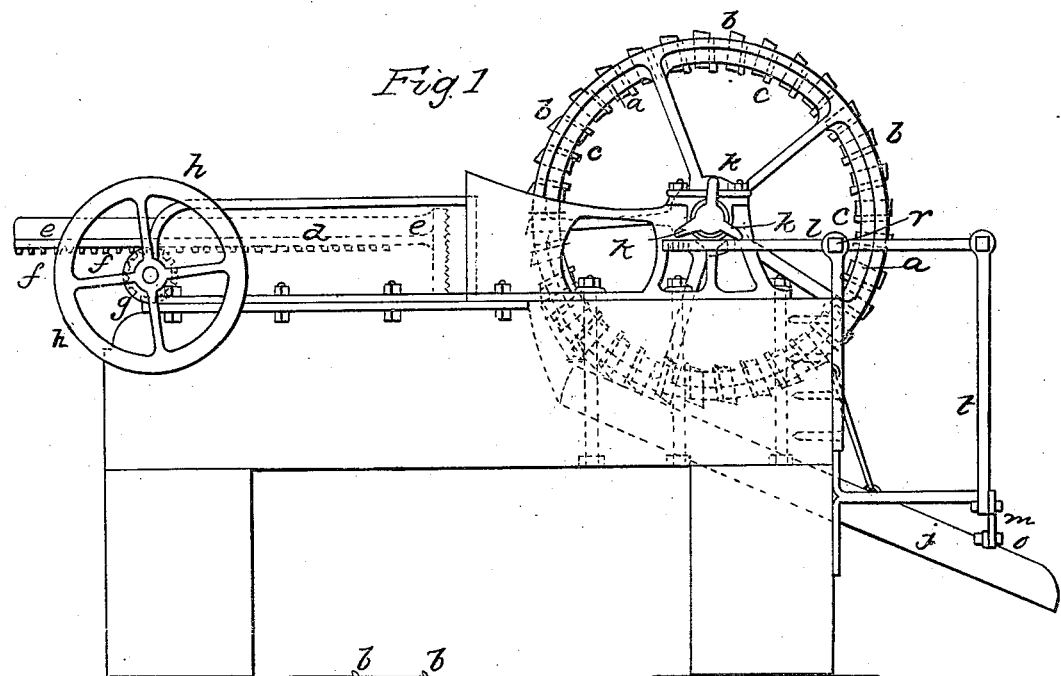
Fig. 1
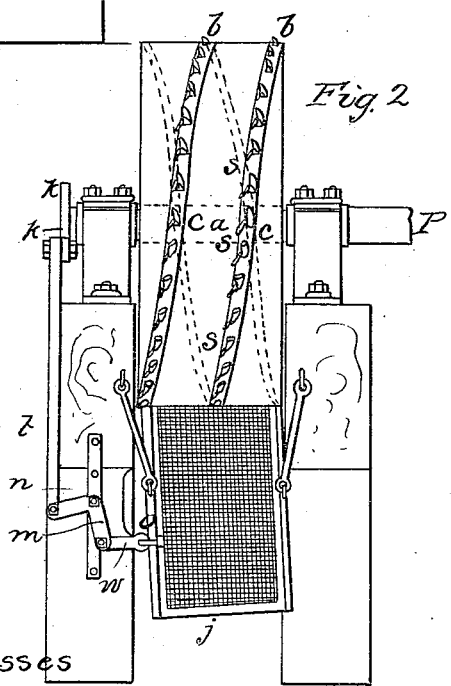
Fig. 2
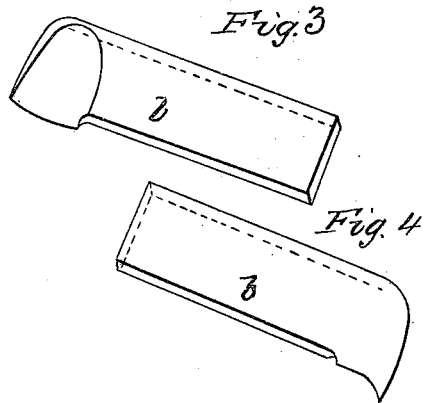
Fig. 3
Fig. 4
Witnesses
W. Anderson
J. G. Gilbert
Inventor
Quincy A. Gilmore

UNITED STATES PATENT OFFICE.

QUINCY A. GILLMORE, OF NEW YORK, N. Y.

MACHINE FOR CUTTING AND SCREENING BITUMINOUS LIMESTONE OR ASPHALT.

Specification of Letters Patent No. 25,254, dated August 30, 1859.

*To all whom it may concern:*

Be it known that I, QUINCY A. GILLMORE, of the city, county, and State of New York, have invented a new and useful machine, called the "rotary asphalt cutter" for cutting up and screening asphalt in the process of manufacturing bituminous mastic; and I do hereby declare that the following is a full, clear, and exact description of the construction and operation of the same, reference being had to the annexed drawings, making a part of this specification, in which—

Figure 1 is a side view, Fig. 2 an end view, looking toward the end to which the screen is attached, and Figs. 3 and 4, perspective views of the knives or cutters, forming a part of the machine.

The machine consists, essentially, of a cylinder or drum $a$, Figs. 1 and 2, arranged for rotating upon a horizontal axis P, Fig. 2, and furnished, on its exterior cylindrical surface, with a number of curved knives, or cutters $b$, Figs. 1, 2, 3 and 4, radiating from the cylindrical surface, and kept in position by keys $c$, Figs. 1 and 2. From the curved edges of these knives $b$, the asphalt after being cut, is discharged along the concave surface of the said knives, on that side toward which the curved points are directed. These knives, or cutters, $b$ are arranged on raised bands or threads which run around the cylinder $a$, in the manner of spirals, either continuously, from one head of the cylinder to the other, as indicated in Fig. 2, or, in branches springing from the middle circle of the cylinder $a$, and running respectively in diverging spirals toward the two heads of said cylinder.

Arrangements to reduce the friction, and prevent the clogging of the cutters (when it is desired to set the knives to cut fine) may be made by scooping out short grooves in the cylinder, running diagonally backward from that side of the knives where the cuttings are discharged. In coarse cutting, these grooves would be unnecessary. They are represented at $s$ Fig. 2.

The machine is fed from a spout or trough $d$ Fig. 1, arranged horizontally, or nearly so, at a convenient height, with one end resting nearly in contact with the cylinder $a$. This spout is supplied with a longitudinal bar $e$, Fig. 1, which can be worked to and from the cylinder by means of rack teeth $f$, Fig. 1, which work into corresponding teeth of the pinion wheel $g$, Fig. 1, on which said bar rests. This pinion wheel $g$, is turned by a hand wheel or crank $h$ Fig. 1, attached outside of the spout.

The end of the bar $e$, next the cylinder $a$, is furnished with a metal plate, or feeder $i$, Fig. 1, set at right angles to the bar $e$, and the spout $d$. By turning the handwheel $h$, the feeder may be pressed against the asphalt, so as to force the latter against the cutters $b$, $b$, on the cylinder. Under the cylinder, at a suitable inclination, a screen $j$, Figs. 1 and 2, is arranged, for separating the coarse cuttings, from the powder or fine cuttings. In order to give motion to this screen $j$, the axis P of the cylinder $a$, is prolonged outside of the frame which supports it. Upon this axis, and at right angles to it, three pins $k$ or a triangular block with projections serving as pins, Figs. 1 and 2, are placed, which pins, by working against the top surface of one end of a lever $l$, Fig. 1, which moves in a vertical plane upon the fulcrum $r$, Fig. 1, communicates to the other end of said lever $l$, a vertical motion, alternately up and down. This end of said lever $l$, is connected by the rod $t$, Figs. 1 and 2, with one end of an elbow piece or bell crank lever $m$ Figs. 1 and 2, pivoted at the angle $n$, Fig. 2, so as to restrain its motion within a vertical plane, parallel to the axis of the cylinder $a$. The other end of the elbow piece or bell crank lever $m$, is attached by the link $w$, Fig. 2, to the screen, at $o$, Figs. 1 and 2. By this means a horizontal motion, to and fro, is given to the screen. Motion is given to the machine by any suitable attachment to the axis P, to which the cylinder, carrying the knives, is attached.

Having thus described the construction and operation of my machine, I do not claim therein, separately considered, the arrangements for feeding the machine, or the device for communicating motion to the screen, and the form of the screen itself; but

What I do claim as new, and desire to secure by Letters Patent, is

1. The rotary cylinder, or drum $a$, carrying knives or cutters $b$, $b$, substantially of the form described, arranged in rows, either with or without the raised bands, substantially as represented, or, in rows parallel or oblique to the axis of the cylinder, for cutting asphalt, sometimes known under the name of bituminous limestone, substantially as described.

2. I also claim the application of the machine as a whole, substantially as described, to the purpose of cutting and screening asphalt, or bituminous limestone.

QUINCY A. GILLMORE.

Witnesses:
JOSEPH G. GILBERT,
W. ANDERSON.